May 23, 1933.  L. BARNETT  1,910,231
SUPPORTING DEVICE FOR ELECTRIC OUTLET BOXES
Filed Nov. 23, 1928
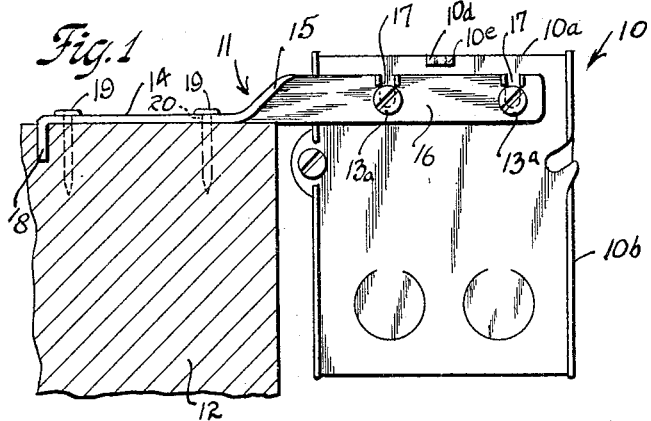
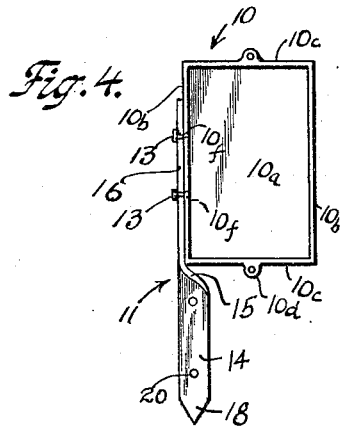
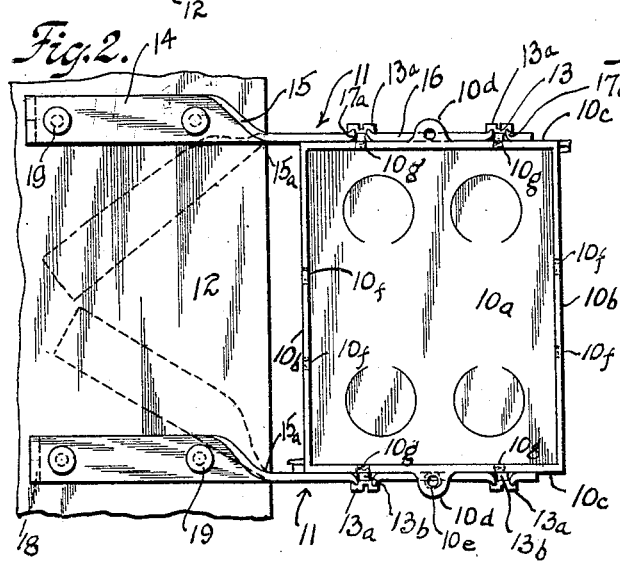
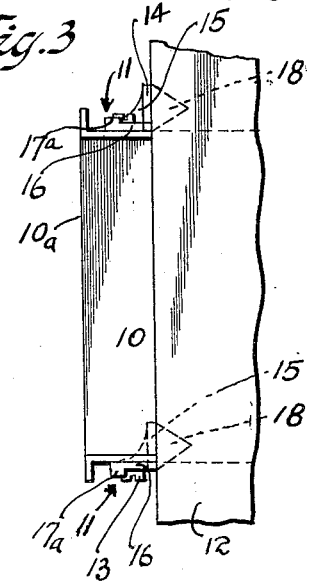
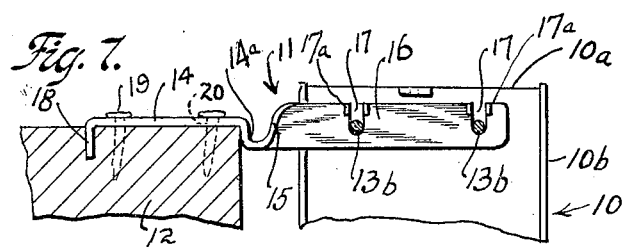
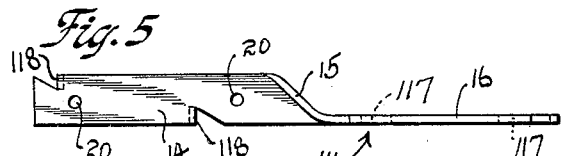
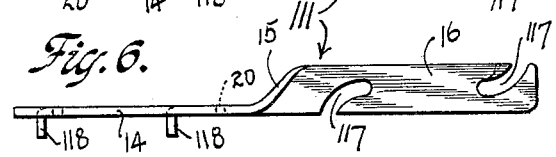
INVENTOR
Louis Barnett.

Patented May 23, 1933

1,910,231

UNITED STATES PATENT OFFICE

LOUIS BARNETT, OF BROOKLYN, NEW YORK

SUPPORTING DEVICE FOR ELECTRIC OUTLET BOXES

Application filed November 26, 1928. Serial No. 321,836.

This invention relates to devices for supporting outlet, junction or switch boxes and the like in electric wiring building installations.

Among the objects of the invention is to generally improve the construction of supporting devices of the character described, said devices being of identical simplified form adapted to be interchangeably secured to any side of a standard type of outlet junction or switch box for facilitating the mounting of the latter in position under both conventional or unusual building requirements at a minimum labor cost, the device furthermore being relatively cheap to manufacture and practical and efficient to a high degree in use.

Other objects of this invention will in part be obvious and in part hereinafter pointed out.

Certain features herein shown and described relate to subject matter contained in my Patent No. 1,692,806 granted Nov. 27, 1928, of which the present application is a continuation in part.

With the above exception, the invention accordingly consists in the features of production, combinations of elements and arrangement of parts which will be exemplified in the constructions hereinafter described and of which the scope of application will be indicated in the following claims.

In the accompanying drawing, in which is shown various possible illustrative embodiments of the invention, Figs. 1, 2 and 3 are top, front and side elevational views, respectively, of an electric switch or junction box supported in position by devices embodying the invention.

Fig. 4 is a front elevational view of a switch or junction box showing an improved supporting device secured to a long side of a standard junction or switch box.

Figs. 5 and 6 are top and side elevational views of an improved box supporting device provided with a modified slot construction adapted to engage the fastening screws threaded into the side of the box.

Fig. 7 is a fragmentary side elevational view showing the improved supporting device offset to vary the aligning of the box with respect to the stud.

Referring in detail to the drawing, 10 denotes an electric outlet box mounted by supporting devices 11 embodying the invention on a vertically extending building structure member or stud 12.

The box 10 may be of any standard construction and as here shown is of the switch or junction type having a rectangular shaped open side 10a which is bounded by long and short side walls 10b and 10c, respectively. Each of the short side walls has outwardly extending therefrom the usual lug 10d. Said lugs are each provided with a threaded hole 10e for engaging with a screw fastened closure or flush plate (not shown), the latter being adapted to extend over said open side 10a in the well understood manner. The box side walls 10b and 10c are each provided with a pair of threaded holes 10f and 10g, respectively, for receiving the screws 13 to fasten the box to the supporting devices 11.

The devices 11 are identical in form, each being adapted to be interchangeably secured to either of the opposite side walls of the box 10. Said devices are preferably made of sheet metal and each comprises a relatively stiff flat strip having a base end portion 14 extending partially the length of the strip, a twisted mid-portion 15 and a hanger end portion 16 extending beyond said twisted portion 15.

The hanger portion 16 is provided with suitable slots 17 spaced to receive the box fastening screws 13. Said slots are preferably made to engage the screws 13, without requiring the removal of the latter from thread holes 10f and 10g. To this end, as shown in Fig. 1, the slots 17 are open-ended to extend in from a longitudinal edge of said portion 16. Said slots are of less width than the heads 13a of the screws 13 but permit the free passage of the screw shank 13b therein. The entering ends of the slots 17 are each formed with outwardly bent restricting lips 17a which form an abutment to prevent accidently displacement and disengagement of the devices 11 from their attachment to the box 10, after the screws 13 are partially or firmly tightened, as is readily understood.

The base end portion 14 may be terminated in a pointed end 18 which can be bent if desired to form a prong for piercing the structure member 12. Said prongs when formed may serve to retain the supporting device 11 in a desired position preparatory to driving nails 19 through suitable spaced holes 20 provided in said base portion 14 for rigidly mounting the box 10 in position as shown in Figs. 1, 2 and 3.

When installing the device 11, should the position of the base portion 14 on the surface of the structure member 12 be obstructed (not shown), said portion 14 can be bent at the end 15a of the twisted portion 15 to either side of the obstruction, shown in dotted lines in Fig. 2.

The twist portion 15 is made relatively short of one quarter turn and provides a stiff interconnection between the base and hanger portions.

Since the base portion 14 comprises a flat strip it may be bent transverse the length or offset at 14a with respect to the alignment of the hanger portion 16 when it is desired to vary the alignment of the top opening of the box 10 with respect to the surface of the stud 12. See Fig. 7.

It should be noted that because of the novel construction of the supporting device 11, it is adapted to be interchangeably secured to any side of the box 10, that is, identical devices 11 may be attached along opposite side walls of the box thus eliminating the necessity of using supporting devices in pairs (a left and a right) for mounting a box 10. The parts of the device 11 are so proportioned that it can be also applied to the long side walls 10b as well as the short side walls 10c. See Fig. 4.

In Figs. 5 and 6 a device 111 of modified construction of supporting device embodying the invention is shown which is similar to the device 11 described above with the exception that the lipped slots are replaced by open-ended L-shaped slots 117 without lip abutment. Said slots are positioned to extend in from opposite edges of the hinge portion and are spaced so that they can be swung into engagement under the heads of the box screw 13 without removing the latter.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A device of the character described for attaching an outlet box to a stud comprising a relatively stiff strip member having a permanent twist portion midway the ends thereof, a flat end portion of said member extending from one side of the twist portion formed with means for attaching the device to the face of the stud, and a flat end portion of said member extending from the other side of said twisted portion provided with means for attachment to the outlet box, the flat side of the portion having the stud attachment means being disposed in alignment with the edge of the portion having the box attachment means, said last mentioned flat portion being bendable transverse the length of said device for offsetting the position of the box with respect to the stud.

2. A supporting device for outlet boxes of the character described comprising an elongated strip member having a flat end portion formed with means for attachment to the face of a stud, and a permanent twist portion in the mid-section of said member adjoining said attachment means, said member terminating in a flat portion adjoining said twist portion provided with means for attachment to an outlet box whereby the latter may be supported from said stud in an overhanging position, the flat side of the portion having the stud attachment means being disposed in alignment with the edge of the portion having the box attachment means, said first mentioned flat portion being bendable on the width thereof for varying the level alignment of said attachment means and the box with respect to said stud face.

3. In a supporting device for outlet boxes of the character described, a strip member having means for attachment to the sides of an outlet box, said means including an open-ended slot for receiving the shank of an attachment screw, portions of the rim of the slot being bent out of the plane of the latter to form a rigid obstruction for the head of the screw when nearly in tightened position.

4. In a supporting device for outlet boxes of the character described, a member having an open-ended slot adapted to receive the shank of a screw for attachment to the sides of the box, the ends of said slot being bent outwardly from the plane of the latter to form lips for abutting the screw head to prevent the passage of the screw from said slot.

5. In a supporting device for outlet boxes of the character described, a member for attachment to the side of the box having an open ended slot adapted to receive the shank of a screw, and means projecting outwardly from said member at the entrance end of said slot to form a barrier against passage of the screw head for preventing the screw from leaving the slot.

In testimony whereof I affix my signature.

LOUIS BARNETT.